US009719831B2

(12) United States Patent
Schultheiss

(10) Patent No.: US 9,719,831 B2
(45) Date of Patent: Aug. 1, 2017

(54) ERROR COMPENSATION BY MEASUREMENT OF THE STC FILTER FUNCTION

(71) Applicant: VEGA Grieshaber KG, Wolfach (DE)

(72) Inventor: Daniel Schultheiss, Hornberg (DE)

(73) Assignee: VERA GRIESHABER KG, Wolfach (DE)

( * ) Notice: Subject to any disclaimer, the term of this patent is extended or adjusted under 35 U.S.C. 154(b) by 217 days.

(21) Appl. No.: 14/396,804

(22) PCT Filed: May 3, 2013

(86) PCT No.: PCT/EP2013/059266
§ 371 (c)(1),
(2) Date: Oct. 24, 2014

(87) PCT Pub. No.: WO2013/164456
PCT Pub. Date: Nov. 7, 2013

(65) Prior Publication Data
US 2015/0097715 A1  Apr. 9, 2015

Related U.S. Application Data

(60) Provisional application No. 61/642,173, filed on May 3, 2012.

(30) Foreign Application Priority Data

May 3, 2012  (EP) .................................... 12166603

(51) Int. Cl.
*G01F 23/284* (2006.01)
*G01F 25/00* (2006.01)
(Continued)

(52) U.S. Cl.
CPC ........ *G01F 23/284* (2013.01); *G01F 25/0076* (2013.01); *G01S 7/02* (2013.01);
(Continued)

(58) Field of Classification Search
CPC ........ G01F 23/22; G01F 23/28; G01F 23/284; G01F 25/0061; G01F 25/0076;
(Continued)

(56) References Cited

U.S. PATENT DOCUMENTS 3,611,380 A * 10/1971 Carlsson ................. G01S 7/282
342/199
4,095,224 A *  6/1978 Dounce ................... G01S 7/288
342/162
(Continued)

FOREIGN PATENT DOCUMENTS

CN       1 898 578     1/2007
CN     101 201 400     1/2007
(Continued)

*Primary Examiner* — Bernarr Gregory
(74) *Attorney, Agent, or Firm* — Fay Kaplun & Marcin, LLP

(57) ABSTRACT

Level measuring device which can compensate the distortions, caused by an STC filter, of the received signal, by measuring a reference signal which passes through the receiving branch and also through the STC filter, during the ongoing operation of the level measuring device or during manufacture. For example, after passing through the receiving branch, this reference signal can be fed to a microprocessor which can calculate the correction values of the IF signal therefrom. A switch can be provided which can switch over between the reference signal and the IF signal.

12 Claims, 4 Drawing Sheets

(51) Int. Cl.

| | | |
|---|---|---|
| *G01S 7/35* | (2006.01) | |
| *G01S 7/40* | (2006.01) | |
| *G01S 13/88* | (2006.01) | |
| *G01S 7/493* | (2006.01) | |
| *G01S 7/02* | (2006.01) | |
| *G01S 13/02* | (2006.01) | |
| *G01F 23/00* | (2006.01) | |
| *G01S 13/00* | (2006.01) | |
| *G01S 7/34* | (2006.01) | |

(52) U.S. Cl.
CPC ............ *G01S 7/354* (2013.01); *G01S 7/4021* (2013.01); *G01S 7/493* (2013.01); *G01S 13/02* (2013.01); *G01S 13/88* (2013.01); *G01S 7/34* (2013.01); *G01S 2007/4073* (2013.01); *G01S 2007/4091* (2013.01)

(58) Field of Classification Search
CPC . G01S 13/02; G01S 13/88; G01S 7/02; G01S 7/28; G01S 7/285; G01S 7/34; G01S 7/35; G01S 7/352; G01S 7/354; G01S 7/40; G01S 7/4004; G01S 7/4021; G01S 7/48; G01S 7/491; G01S 7/493; G01S 7/4052; G01S 2007/4052; G01S 2007/406; G01S 2007/4073; G01S 2007/4082; G01S 2007/4091; G01S 7/288; G01S 13/87; G01S 7/282; G01S 7/4008; F41G 7/20; F41G 7/22; F41G 7/2273; F41G 7/2286
See application file for complete search history.

(56) References Cited

U.S. PATENT DOCUMENTS

| | | | | |
|---|---|---|---|---|
| 4,201,986 | A | * | 5/1980 | Ducrocq ................. G01S 13/87 342/100 |
| 4,228,434 | A | * | 10/1980 | Williamson .......... F41G 7/2286 331/10 |
| 4,338,602 | A | * | 7/1982 | Roeder ................. F41G 7/2286 342/159 |
| 4,539,565 | A | * | 9/1985 | Norsworthy .......... G01S 7/4008 342/128 |
| 4,737,791 | A | | 4/1988 | Jean et al. |
| 5,864,313 | A | * | 1/1999 | Speck ................... G01S 7/4004 342/101 |
| 5,945,942 | A | | 8/1999 | Artis et al. |
| 6,597,308 | B2 | * | 7/2003 | Isaji ......................... G01S 7/35 342/128 |
| 7,099,662 | B2 | | 8/2006 | Fuenfgeld et al. |
| 7,429,947 | B2 | | 9/2008 | Shima |
| 7,639,177 | B2 | * | 12/2009 | Welle .................... G01F 23/284 342/124 |
| 7,710,125 | B2 | | 5/2010 | Schultheiss et al. |
| 7,982,664 | B1 | | 7/2011 | Uscinowicz |
| 8,847,816 | B2 | | 9/2014 | Feil |
| 2008/0024145 | A1 | | 1/2008 | Schultheiss et al. |
| 2011/0181458 | A1 | | 7/2011 | Feil |

FOREIGN PATENT DOCUMENTS

| | | |
|---|---|---|
| CN | 101 495 840 | 7/2009 |
| DE | 10 2008 050 117 | 4/2010 |
| EP | 1 207 406 | 5/2002 |
| WO | 97/09637 | 5/1997 |
| WO | 2008/012029 | 1/2008 |

* cited by examiner

ERROR COMPENSATION BY MEASUREMENT OF THE STC FILTER FUNCTION

FIELD OF THE INVENTION

The invention relates to level measurement. In particular, the invention relates to a level measuring device in particular to a filling level radar, for compensating an error occurring in the receiving branch of the level measuring device during determination of the filling level and to a method for error compensation by measuring a filter function of a receiving branch of a level measuring device.

TECHNOLOGICAL BACKGROUND

Level measuring devices which operate according to the frequency modulated continuous wave (FMCW) principle should have relatively great dynamics, since all the echoes are at the receiver at the same time. The various echoes can be, for example, small and relatively far-off useful echoes as well as relatively strong spurious echoes from the short range of the antenna. These spurious echoes can be caused, for example, by deposit build-up in or on the antenna, by fixtures in front of the antenna or by a finite uncoupling of the duplexer in the HF module of the level radar.

Furthermore, echoes in the short range of the antenna can generally have very high amplitudes in contrast to echoes which are further away and have extremely low amplitudes.

To be able to process all these echoes in an intermediate frequency channel (IF channel), then in this case as well, the IF dynamics of, for example, the analog/digital converter provided in the receiving branch of the level measuring device may have to be very high.

A widely-used option of compressing the dynamics, i.e. of reducing the dynamic range, is to use a so-called STC function. In the present context, "STC" stands for "Sensitivity Time Control".

The STC function is used to attenuate the large signals in the short range of the antenna and can be realised very easily in an FMCW system by a high-pass filter.

A high-pass filter can attenuate the signals with relatively small frequencies. Since the small frequencies correspond to a short distance from the antenna, the disturbing, large signals in the short range of the antenna can be attenuated or can even be completely filtered out as a result, thereby reducing the differences in the amplitudes of the IF signal.

However, the course of the curve of the measuring signal can also be influenced by the distance-dependent attenuation of the echo signals which, in turn, can affect the accuracy of the sensor in the short range.

SUMMARY OF THE INVENTION

An object of the invention is to improve the measuring accuracy in the short range of the antenna.

The invention provides a level measuring device for compensating an error occurring in the receiving branch of the level measuring device during the determination of the filling level and a method for error compensation in the receiving branch of a level measuring device by measuring a filter function according to the features of the independent claims. Developments of the invention are set out in the subclaims and in the following description.

The embodiments described in the following relate equally to the level measuring device and to the method. In other words, the features stated in the following with regard to the level measuring device can also be implemented as steps in the method, and vice versa.

According to a first aspect of the invention, a level measuring device is provided for the compensation of an error occurring in the receiving branch of the level measuring device during the determination of the filling level, which device comprises a reference signal provision unit (for example in the form of a data memory or a signal generator) for the provision of a reference signal, a receiving unit for recording a measuring signal, a receiving branch with an FMCW module which is configured to convert the measuring signal into an intermediate frequency signal, and a processor unit for calculating correction values to correct the received signal using the reference signal.

The reference signal provision unit provides (for example generates) a reference signal and the receiving unit records a measuring signal which is the component of the signal transmitted from the antenna which has been reflected at the filling material or at other items, such as container fixtures, container base, dirt or deposits in the container, or has been reflected at the antenna. The filling level is then calculated from the recorded measuring signal.

Before the filling level is calculated from the measuring signal, the measuring signal is converted into an intermediate frequency signal and is then subjected to signal processing which can comprise, for example, a filtering procedure and an analog/digital conversion. In the following, the partly or completely processed intermediate frequency signal is also called the received signal.

After the intermediate frequency signal has been processed, the signal resulting therefrom can be corrected, to compensate, for example, the filter function of an STC filter of the receiving branch. To calculate the correction values for correcting the resulting signal, an inverse filter function can be used which has either already been stored as a reference signal in the memory unit of the level radar during manufacture or is generated during operation of the level radar by switching over to the reference signal.

According to an embodiment of the invention, the reference signal provision unit comprises a reference signal generating unit to generate a reference signal. Furthermore, a first switching unit is provided which is connected on the input side to the FMCW module and to the reference signal generating unit and is connected on the output side to an STC filter of the receiving branch and is configured to switch over between the intermediate frequency signal and the reference signal, so that either the intermediate frequency signal or the reference signal can be fed to the STC filter.

The first switching unit is used to switch over between the received signal corresponding to the measuring signal and the reference signal. The processor unit is configured to calculate correction values for correcting the received signal using the reference signal.

The reference signal provision unit and the processor unit can be the same units (i.e. the reference signal can be generated by the processor unit). However, they can also be different units or at least different units in part. For example, the processor unit can control a separate component which generates the reference signal on the command of the processor unit.

The received signal corresponding to the measuring signal can be in particular an intermediate frequency signal (IF signal) which has been generated from the measuring signal. For this purpose, a so-called FMCW front end, hereafter also called an FMCW module, can be provided which receives the measuring signal from the receiving unit (antenna) and converts it into the intermediate frequency signal. This FMCW module can also be configured to generate the transmitted signal.

Furthermore, the switching unit can be connected to the FMCW module, so that the intermediate frequency signal is fed directly to the switching unit from the FMCW module.

The switching unit can then forward either the intermediate frequency signal or the reference signal to the components, connected thereto, of the receiving branch.

According to an embodiment of the invention, the processor unit is configured to correct distance errors of the received signal which are associated with a distance-dependent attenuation. These distance errors can result, for example, from a non-linear temperature behaviour of the receiving branch and in particular of the STC filter. However, it is also possible for the processor unit to correct other errors of the received signal, which errors are caused by the processing of the measuring signal in the receiving branch.

According to a further embodiment of the invention, the reference signal generating unit is a microprocessor. In particular, it can be identical to the processor unit described above. A distinct microprocessor can also be provided.

According to a further embodiment of the invention, the reference signal generating unit comprises a voltage-controlled oscillator (VCO), a phase locked loop (PLL) or a direct digital synthesis device (DDS).

This component can be controlled by the processor unit and generates the reference signal.

According to a further embodiment of the invention, the frequency of the reference signal is traversed ("swept through") in order to record a reference filter curve of the receiving branch of the level measuring device, which reference filter curve is then used to calculate the correction values.

For example, the frequency is traversed from 0 Hz to the highest occurring IF frequency. It is also possible for the reference signal to be traversed from 0 Hz up to a frequency which is lower than the highest occurring IF frequency. It can also be provided that the reference signal is traversed from a settable starting frequency (not equal to zero) up to a maximum frequency which can also be set.

According to a further embodiment of the invention, the correction values are calculated during the operation of the level measuring device. It can also be provided that the correction values are calculated once during adjustment of the sensor, i.e. for example during activation.

If the correction values are calculated during the operation of the level measuring device, this can take place, for example, subject to the current temperature and/or can be carried out, for example, every 10 to 100 measurements and/or for example once per hour. If the correction values are calculated subject to the temperature, one or more temperature measuring sensors are provided for this purpose, which detect marked changes in temperature in the level measuring device and then, if appropriate, trigger a new calculation of the correction values by generating the reference signal and tripping the first switching unit.

According to a further embodiment of the invention, an analog/digital converter is provided in the receiving branch. A second switching unit is also provided which can feed the reference signal directly into the analog/digital converter.

In this way, the reference signal can be measured while avoiding the components which are arranged between the A/D converter and the antenna in the receiving branch. This is advantageous, for example, if the form of the reference signal is unknown or is not sufficiently known.

The two switching units can be, for example, integrated analog switches, for example in the form of transistors, or integrated circuits or relays.

According to a further embodiment of the invention, the level measuring device is an FMCW radar system.

According to a further aspect of the invention, a method is provided for error compensation in the receiving branch of a level measuring device by measuring a filter function of the receiving branch, in which method a reference signal is generated and a measuring signal is recorded. In the receiving branch, it is then possible to switch over between a received signal which corresponds to the measuring signal and the reference signal and in this way, correction values can be calculated for correcting the received signal using the reference signal.

According to a further embodiment of the invention, the frequency range of the reference signal is traversed in order to record a reference filter curve of the receiving branch of the level measuring device, which reference filter curve is used to calculate the correction values.

According to a further embodiment of the invention, the reference signal is measured by feeding the reference signal directly into an analog/digital converter.

In the following, embodiments of the invention will be described with reference to the figures.

DETAILED DESCRIPTION OF EMBODIMENTS

Figure 1:
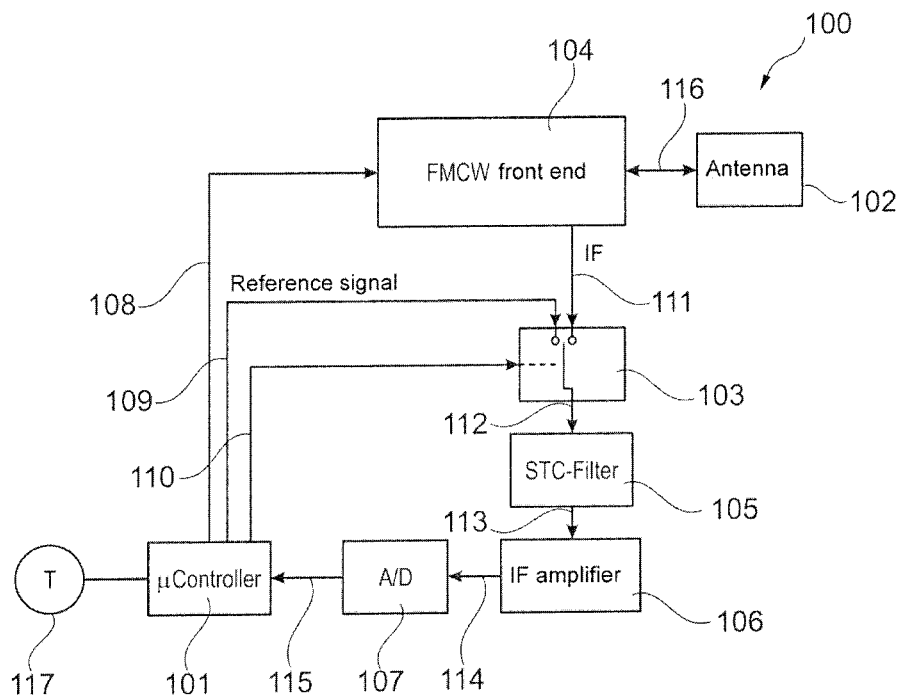
FIG. 1 shows the circuit of a level measuring device according to a first embodiment of the invention.

The illustrations in the figures are schematic and are not to scale.

In the following description of the figures, when the same reference numerals are used in different figures, they denote the same or similar elements. However, the same or similar elements can also be denoted by different reference numerals.

FIG. 1 shows a level measuring device 100 which comprises a reference generating unit 101, a receiving unit 102, a first switching unit 103 and a processor unit 101 which, in this embodiment, is the same as the reference generating unit.

The processor unit 101, for example a microprocessor, controls the different components and is connected to the FMCW front end 104 via the first signal path 108. In this FMCW front end 104, the transmission signal is generated which is then forwarded to the antenna 102 via the bidirectional line 116. The antenna then receives the reflected measuring signal and returns it to the FMCW front end 104 via the bidirectional connection 116. The measuring signal is converted into an IF received signal in the FMCW front end and transferred to the first switching unit 103 via the signal line 111.

The processor unit 101 is also capable of serving as a reference signal generating unit and generates a reference signal as required, which is also transferred to the first switching unit 103 via the data line 109. Furthermore, the processor unit 101 controls the first switching unit 103 via the data line 110, so that this switching unit can switch over between the reference signal and the IF received signal.

The reference signal or optionally the IF received signal is then transferred to the STC filter 105 via the signal line 112 from the first switching unit 103. The STC filter then performs, for example, a high-pass filtering to attenuate the high amplitudes at small frequencies (which are to be attributed to disturbing effects in the short range of the antenna).

The filtered signal is then transferred from the STC filter via the signal line 113 to the IF amplifier 106 which amplifies said filtered signal. The amplified signal is then transferred from the IF amplifier 106 via the data line 114 to the analog/digital converter 107 which digitizes the signal and then transfers it via the signal line 115 to the processor unit 101 which can subsequently determine the filling level from this signal.

The processor unit 101 can also calculate the correction values to correct the received signal in that the reference signal is fed to the processor unit 101 after it has passed through the switch 103, the STC filter 105, the IF amplifier 106 and the analog/digital converter 107, i.e. after it has passed through the entire IF branch.

In other words, installed in the IF branch of the receiver is a change-over switch 103 which makes it possible to switch back and forth between the measuring signal and the reference signal. The reference signal is used to characterize the characteristic curve of the STC filter or of the entire IF branch. From this curve, it is possible to calculate correction values which can be used to correct the IF sampled values. The distance error which has resulted due to the distance-dependent attenuation can be compensated thereby. Further signal processing can be performed in the usual manner.

It can be considered as a core aspect of the invention that the measuring accuracy of the level measuring device is improved particularly in the short range of the antenna by correcting the STC filter curve or the frequency response of the entire IF branch of the level measuring device. This is performed, for example, by switching off (disconnecting) the antenna and the FMCW front end from the receiving branch and simultaneously connecting a reference signal to the receiving branch. This reference signal passes through the receiving branch and in particular through the STC filter and thereafter is used to correct the received signal. Alternatively, the signal used for correction can also be stored in the level measuring device during manufacture. Ultimately, this is therefore a type of calibration which can be carried out during the ongoing operation of the level measuring device.

Arranged in the IF chain (i.e. of the receiving branch), downstream of the mixer (not shown in the figures) of the FMCW front end 104, is a change-over switch ("first switch unit") 103, using which it is possible to switch over between the IF received signal and the reference signal, generated for example by the processor unit 101.

In this respect, the reference signal is traversed from 0 Hz to the highest occurring maximum IF frequency and the filter curve (with attenuation and phase response) of the entire IF chain is recorded. Recording is carried out, for example, by the processor unit 101 or by a memory unit (not shown) connected thereto.

From this data, it is then possible to calculate an inverse filter function which can be used to correct the sampled values of the intermediate frequency signal.

The distance evaluation can then be carried out on the IF curve corrected in this manner.

The filter curve (i.e. the reference signal) can either be measured regularly during operation of the level measuring device or once when the level measuring device is adjusted. An advantage of measuring the filter curve during operation of the level measuring device is that in this case, temperature dependencies can be detected. Provided for this purpose are one or more temperature sensors 117 which are also connected to the processor unit 101.

Figure 2:
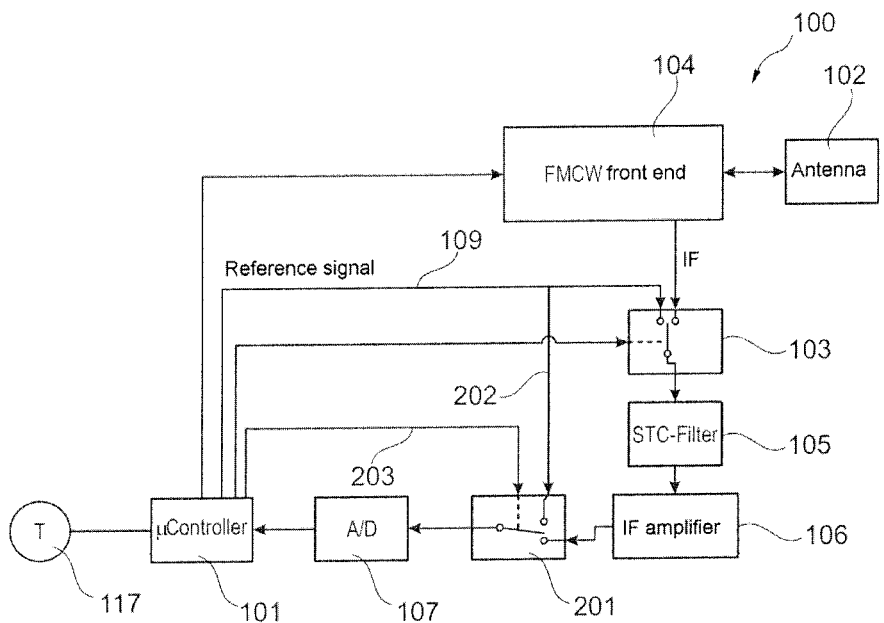
FIG. 2 shows the circuit of a level measuring device according to a further embodiment of the invention.

FIG. 2 shows a level measuring device which, in addition to the components contained in the measuring device of FIG. 1, allows the measurement of the reference signal without an IF branch. Provided for this purpose is a second switching unit 201 which is arranged between the IF amplifier 106 and the analog/digital converter 107. This switching unit is controlled by the processor unit 101 via the control signal line 203 and can switch back and forth between the components of the receiving branch (STC filter 105, IF amplifier 106) and the reference signal from the processor unit 101. For this purpose, the frequency signal branch 109 is not only connected to the first switching unit 103, but also to the second switching unit 201 via the line 202.

If, for example, the reference signal is not precisely known, it can be measured directly in this manner.

Figure 3:
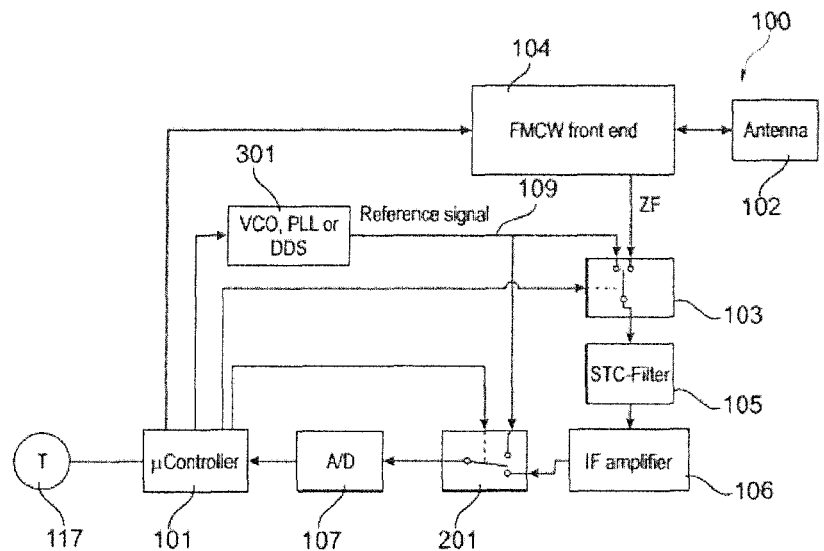
FIG. 3 shows the circuit of a level measuring device according to a further embodiment of the invention.

As shown in FIG. 3, the reference signal can also originate from a different source. This can be, for example, a VCO, a DDS or PLL 301. Depending on the quality of the reference signal, it can also be fed directly to the analog/digital converter 107 for characterisation, without the IF chain. A further change-over switch 201 is required for this purpose between the A/D converter and the IF amplifier 106. The processor unit 101 assumes the control of the first and second switching units 103, 201.

Figure 4:
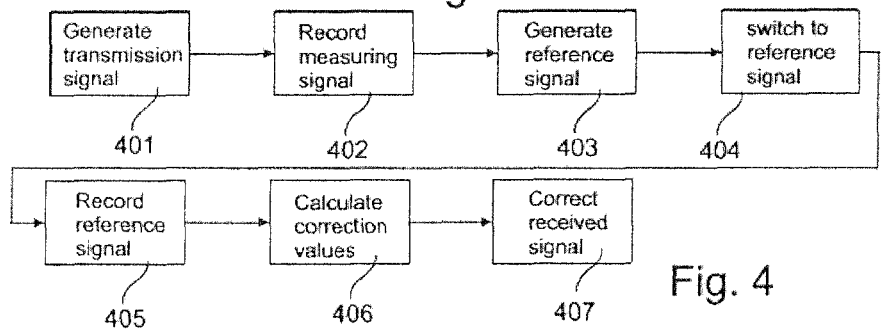
FIG. 4 shows a flow chart of a method according to an embodiment of the invention.

FIG. 4 shows a flow chart of a method according to an embodiment of the invention. In step 401, a transmission signal is generated in the level measuring device and is transmitted via the antenna in the direction of the filling material. In step 402, the corresponding measuring signal is recorded and converted into an intermediate frequency signal. In step 403, a reference signal is generated which is traversed in the frequency and in step 404, a switch-over is performed in the receiving branch from the IF received signal to the reference signal which then passes through the IF branch and is recorded in step 405 by a processor unit. In step 406, correction values are calculated from this reference signal and these correction values are used to correct the received signal in step 407. For this, the switch can be switched back again so that new measuring signals can pass through the IF branch, which new measuring signals are then corrected in the microprocessor.

Figure 5:
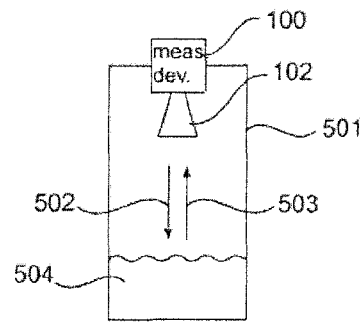
FIG. 5 shows a level measuring system according to an embodiment of the invention.

FIG. 5 shows a level measuring system comprising a container 501 which holds a filling medium 504. Attached to the top of the container is a level measuring device 100 which transmits a transmission signal 502 in the direction of the surface of the filling material. The reflected measuring signal 503 is then received by the duplexer 102 and is fed to the FMCW front end.

Further signal processing is carried out as described above.

Figure 6:
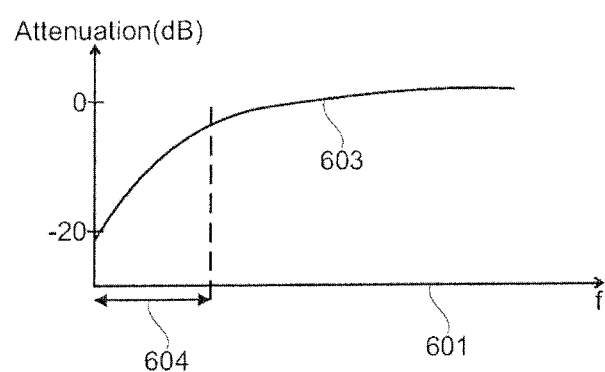
FIG. 6 shows a filter function of an STC filter.

FIG. 6 is a schematic illustration of a filter function of an STC filter. The signal 603 is attenuated subject to the frequency 601 of the intermediate frequency signal. The attenuation is, for example, 20 dB for low frequencies. The attenuation is to be disregarded for high frequencies. The filter function shown in FIG. 6 is configured to attenuate relatively strongly the part 604 of the intermediate frequency signal corresponding to the short range of the antenna, in order to attenuate the high signal amplitudes of the intermediate frequency signal in the short range of the antenna.

The filter function of the STC filter, the filter function of the analog/digital converter and/or the filter function of the part of the receiving branch which is located downstream of the FMCW front end 104 (cf. FIG. 1) can be measured using the reference signal.

By means of the thus determined filter function, it is possible to calculate the correction values for the intermediate frequency signal, for example by inverting the filter function obtained by the measurement and then applying this "inverse" filter function to the processed intermediate frequency signal which is present in the processor unit 101 in order to compensate the filter function by way of calculation.

Figure 7:
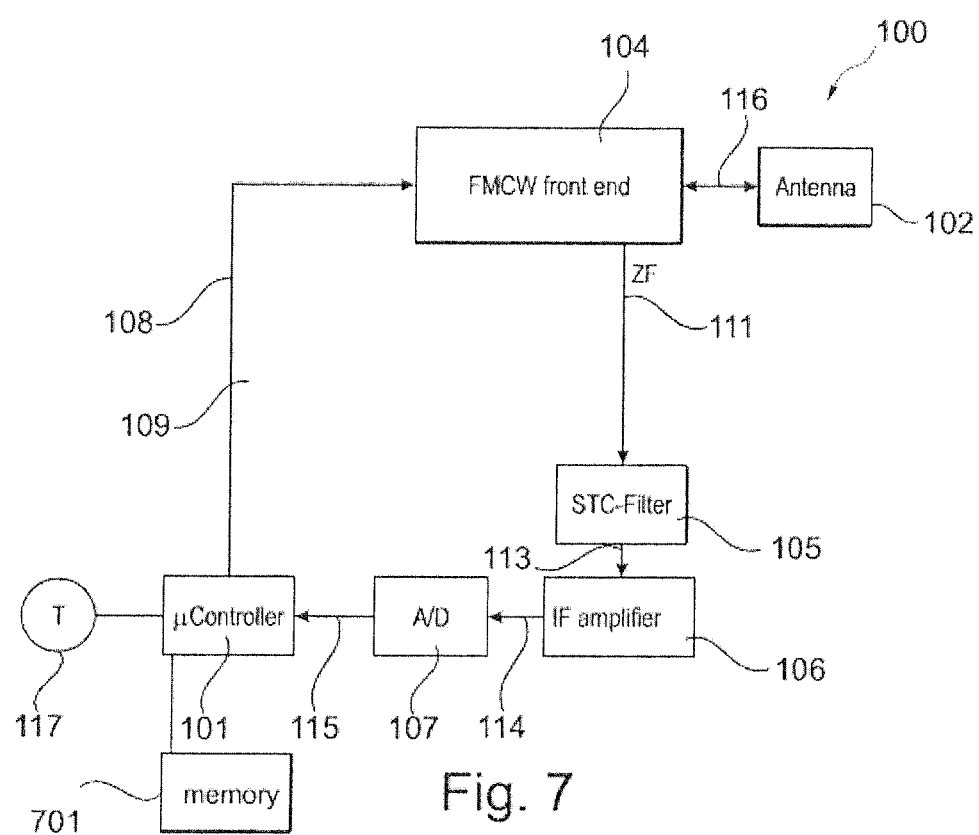
FIG. 7 shows the circuit of a level measuring device according to a further embodiment of the invention.

Instead of measuring the filter function of the STC filter, of the analog/digital converter and/or of the entire receiving branch downstream of the FMCW front end, the inverse filter function or the actual filter function of STC filter, analog/digital converter and/or receiving branch downstream of the FMCW front end can already be stored during manufacture in the processor or in a memory 701 connected thereto (cf. FIG. 7). In this case, the reference signal generating unit and the switching unit are not required, because the correction values can be directly calculated from the reference signal which has already been stored.

In addition, it is pointed out that the terms "comprising" and "having" do not exclude any other elements or steps and "a" or "an" does not exclude a plurality. It is also pointed out that features or steps which have been described with reference to one of the above embodiments can also be used combined with other features or steps of other embodiments described above. Reference numerals in the claims should not be construed as limiting the scope of the claims.

The invention claimed is:

1. A level radar for compensating an error occurring during a determination of a filling level, comprising:
 a reference signal provision unit configured to provide at least one of (a) a reference signal or (b) correction values;
 a receiving unit recording a measuring signal;
 a receiving branch having an FMCW module which is configured to convert the measuring signal into an intermediate frequency signal; and
 a processor unit configured to at least one of:
  (a) calculate correction values to correct the intermediate frequency signal using the reference signal; and
  (b) use the correction values provided by the reference signal provision unit to correct the intermediate frequency signal.

2. The level radar according to claim 1, wherein the reference signal provision unit includes a reference signal generating unit generating a reference signal and wherein the level radar further comprising:
 a first switching unit connected on an input side to the FMCW module and the reference signal generating unit, the first switching unit being connected on an output side to a sensitivity time control ("STC") filter of the receiving branch, the first switching unit being configured to switch over between the intermediate frequency signal from the FMCW module and the reference signal from the reference signal provision unit so that either the intermediate frequency signal or the reference signal is fed to the STC filter.

3. The level radar according to claim 2, wherein the reference signal generating unit is a microprocessor.

4. The level radar according to claim 1, wherein the processor unit is configured to correct distance errors associated with a distance-dependent attenuation of the intermediate frequency signal.

5. The level radar according to claim 1, wherein the reference signal generating unit is a voltage controlled oscillator, a phase locked loop or a direct digital synthesis device.

6. The level radar according to claim 1, wherein the reference signal generating unit is configured to pass through the frequency of the reference signal so that the processor unit can record a reference filter curve of the receiving branch of the level radar, which reference filter curve is used to calculate the correction values.

7. The level radar according to claim 1, wherein the processor unit is configured to calculate the correction values during operation of the level radar.

8. The level radar according to claim 1, wherein the receiving branch includes an A/D converter and wherein the level radar further comprising:
 a second switching unit directly feeding the reference signal into the A/D converter.

9. A method for error compensation in a receiving branch of a level measuring device by measuring a filter function of the receiving branch, comprising steps of:
 provisioning at least one of (a) a reference signal or (b) correction values;
 recording a measuring signal;
 converting the measuring signal into an intermediate frequency signal; and
 calculating at least one of:
  (a) correction values to correct the intermediate frequency signal using the reference signal; and
  (b) a correction to the intermediate frequency signal using the correction values provided by a reference signal provision unit.

10. The method according to claim 9, further comprising the step of:
 switching over, in the receiving branch, between a received signal, corresponding to the measuring signal, and the reference signal.

11. The method according to claim 9, further comprising the step of:
 passing through the frequency of the reference signal to record a reference filter curve of the receiving branch of the level measuring device, which reference filter curve is used to calculate the correction values.

12. The method according to claim 9, further comprising the step of:
 measuring the reference signal by directly feeding the reference signal into an A/D converter.

* * * * *